(12) United States Patent
Karlsson (10) Patent No.: US 10,749,779 B2
(45) Date of Patent: Aug. 18, 2020

(54) METHOD AND SYSTEM FOR SYNCHRONIZATION OF NODE DEVICES IN A COAXIAL NETWORK

(71) Applicant: InCoax Networks Europe AB, Gävle (SE)

(72) Inventor: Carl Karlsson, Sandviken (SE)

(73) Assignee: INCOAX NETWORKS AB, Gävle (SE)

( * ) Notice: Subject to any disclaimer, the term of this patent is extended or adjusted under 35 U.S.C. 154(b) by 0 days.

(21) Appl. No.: 15/422,718

(22) Filed: Feb. 2, 2017

(65) Prior Publication Data

US 2018/0167299 A1   Jun. 14, 2018

(30) Foreign Application Priority Data

Dec. 8, 2016   (EP) .................................. 16202957

(51) Int. Cl.
*H04L 12/26*   (2006.01)
*H04J 3/06*   (2006.01)
(Continued)

(52) U.S. Cl.
CPC ........ *H04L 43/0864* (2013.01); *H04J 3/0682* (2013.01); *H04L 5/0048* (2013.01);
(Continued)

(58) Field of Classification Search
CPC . H04L 43/0864; H04L 7/0041; H04L 5/0048; H04L 12/2838; H04L 12/2801;
(Continued)

(56) References Cited

U.S. PATENT DOCUMENTS 6,195,362 B1 *   2/2001   Darcie ................ H04L 12/2801
                                                    370/431
6,463,049 B1 *  10/2002   Abe ..................... H04B 7/2681
                                                    370/347
(Continued)

FOREIGN PATENT DOCUMENTS

WO         2013143385 A1    10/2013
WO     WO-2014186624 A1 *   11/2014   ........... H04B 7/0617
(Continued)

OTHER PUBLICATIONS

IEEE Standard for Local Metropolitan area networks—Timing and Synchronization for Time-Sensitive Applications in Bridged Local Area Network, published Mar. 30, 2011. Fetched Mar. 1, 2018 from http://ieeexplore.ieee.org/stamp/stamp.jsp?tp=&arnumber=5741898; Chapter E4, Path delay measurement over a CSN backbone.

(Continued)

*Primary Examiner* — Justin T Van Roie
(74) *Attorney, Agent, or Firm* — Moore & Van Allen PLLC; Henry B. Ward, III (57) ABSTRACT

Method for synchronization of a MoCA network including a plurality of MoCA node devices ($n_0$-$n_4$) interconnected through a coaxial network. The method includes transmitting a reference signal from a first node device onto the coaxial network. The method further includes receiving a loopback signal from a further node device through the coaxial network, determining a time delay value ($d_{i,j}$) based on a time lapse ($T_{i,j}$) between transmitting the reference signal and receiving the loopback signal, and sending the time delay value to said further node device.

21 Claims, 4 Drawing Sheets

(51) Int. Cl.
  *H04L 12/28* (2006.01)
  *H04L 12/24* (2006.01)
  *H04L 5/00* (2006.01)
  *H04L 7/00* (2006.01)
  *H04J 3/00* (2006.01)

(52) U.S. Cl.
  CPC ........ *H04L 7/0041* (2013.01); *H04L 12/2801* (2013.01); *H04L 12/2838* (2013.01); *H04L 41/0836* (2013.01); *H04L 43/0858* (2013.01); *H04J 3/00* (2013.01); *H04L 12/28* (2013.01)

(58) Field of Classification Search
  CPC . H04L 43/0858; H04L 41/0836; H04L 12/28; H04J 3/0682; H04J 3/00
  See application file for complete search history.

(56) References Cited

U.S. PATENT DOCUMENTS

| | | | |
|---|---|---|---|
| 9,106,435 B2* | 8/2015 | Matheney | H04L 12/2801 |
| 2008/0247334 A1* | 10/2008 | Lee | H04L 12/2807 370/255 |
| 2008/0271076 A1* | 10/2008 | Schlack | G06F 21/10 725/39 |
| 2010/0098110 A1 | 4/2010 | Mueller | |
| 2010/0171530 A1 | 7/2010 | Deppe et al. | |
| 2011/0216816 A1* | 9/2011 | Frenzel | H04B 1/38 375/222 |
| 2011/0274156 A1* | 11/2011 | Mighani | H04N 21/2381 375/240.02 |
| 2013/0133012 A1 | 5/2013 | Ling et al. | |
| 2013/0138826 A1* | 5/2013 | Ling | H04L 69/28 709/230 |
| 2014/0057549 A1* | 2/2014 | Ling | H04H 20/74 455/3.02 |
| 2014/0186025 A1* | 7/2014 | Fang | H04J 3/0667 398/25 |
| 2014/0199072 A1* | 7/2014 | Nuijts | H04J 3/0682 398/75 |

FOREIGN PATENT DOCUMENTS

| | | |
|---|---|---|
| WO | 2015017397 A1 | 2/2015 |
| WO | 2015160293 A1 | 10/2015 |

OTHER PUBLICATIONS

International Search Report for related International Patent Application No. PCT/SE2017/051239 dated Mar. 6, 2018.
Written Opinion for related International Patent Application No. PCT/SE2017/051239 dated Mar. 6, 2018.
Extended European Search Report for corresponding European Patent Application No. 16202957.3 dated May 19, 2017.

* cited by examiner

METHOD AND SYSTEM FOR SYNCHRONIZATION OF NODE DEVICES IN A COAXIAL NETWORK

FIELD OF THE INVENTION

The present invention relates to improvements in the art of a MoCA (Multimedia over Coaxial Alliance) networks, in which data communication is provided over a coaxial network. More specifically, it relates to methods for setting up a MoCA network where a plurality of MoCA node devices which are interconnected through such a coaxial network are synchronized, and to MoCA node devices configured for use in such a system. In addition, the invention relates to methods and MoCA node devices configured to operate in a synchronized manner.

BACKGROUND

Since television became a commodity in homes, hotels, offices and other buildings, coaxial (coax in short) networks have regularly been implemented in such facilities. As a result, a large percentage of such facilities built in developed countries during at least the last 50 years are provided with such coaxial networks. Provision of signal access to a building has been accomplished in different ways throughout the years, from the early solution with a local antenna receiver to wired cable TV connection, and later optical fiber networks. Still, there is a need to distribute access within the building, for which the local coaxial network may be used.

Multimedia over Coaxial Alliance (MoCA) is an industry standard alliance developing technology for the connected home. MoCA technology runs over the existing in-home coaxial cabling, enabling whole-home distribution of digital content. MoCA provides the backbone for the home digital entertainment network, and supports streaming media such as standard television and allows linking a set-top box to a TV and other entertainment such as computers or game consoles in multiple rooms using existing wiring.

MoCA is designed and used for providing data access within a home. To operate and gain access to an exterior network provider, a MoCA node device is required. The MoCA node device may be a MoCA adapter or modem, having at least a coaxial connector for connection to the coaxial network, and a network output, such as an Ethernet switch. The node device further includes a MoCA chip or chipset, configured to control media-sharing in accordance with one or more of the MoCA specifications, in cable-equipped households.

In a building complex, a plurality of MoCA node devices may be connected to a common coaxial network. Such MoCA node devices are free running devices, meaning that their local clocks are not synchronized. This means that a MoCA system including a plurality of node devices is typically not optimized for running applications requiring very accurate synchronization to determine time delays relative to each other.

SUMMARY

An improved method for synchronizing MoCA node devices interconnected in a coaxial network, as well as MoCA node devices and methods for operating such a synchronized system, are provided in accordance with the appended claims.

According to a first aspect, a method is provided for synchronization of a MoCA (Multimedia over Coaxial Alliance) network including a plurality of MoCA node devices interconnected through a coaxial network, comprising the steps of:

transmitting a reference signal from a first node device onto the coaxial network;

receiving a loopback signal from a further node device through the coaxial network;

determining a time delay value based on a time lapse between transmitting the reference signal and receiving the loopback signal;

sending the time delay value to said further node device.

In one embodiment, said steps of transmitting, receiving and determining are carried out successively for each pair of node devices among said plurality of node devices.

In one embodiment, the method comprises compiling a set of time delay values associated with each two node devices; and wherein the step of sending involves sending said set of time delay values to each node device.

In one embodiment, a time delay value is determined for each further node device with respect to the first node device, configured to compensate for different propagation time between the first node device and the respective further node device.

In one embodiment, the method comprises the step of transmitting a control signal from the first node device onto the coaxial network, triggering a single further node device to act as loopback node.

In one embodiment the reference signal is transmitted at a first frequency, and the loopback signal is received at a second frequency.

According to a second aspect, a method is provided for synchronization of a MoCA network including a plurality of MoCA node devices interconnected through a coaxial network, comprising the steps of:

receiving a reference signal from a first node device, in a further node device, through the coaxial network;

transmitting a loopback signal from the further node device to the first node device through the coaxial network, responsive to receiving the reference signal;

receiving a time delay value in the further node device, based on a time lapse between transmitting the reference signal and receiving the loopback signal in the first node device.

According to a third aspect, a method is provided for performing a synchronized service in a MoCA network including a plurality of MoCA node devices interconnected through a coaxial network, comprising the steps of:

receiving a trigger signal, transmitted from a first node device through the coaxial network, in a further node device;

generating an activation signal responsive to receiving the trigger signal, by applying a time delay value associated with a propagation time through the coaxial network between the first node device and the further node device;

triggering executing of an action by means of the activation signal.

In one embodiment, the method comprises the step of receiving the trigger signal in each one of a group of further node devices;

wherein the step of generating an activation signal is carried out in each further node device in said group by applying a time delay determined for each further node device with respect to the first node device, configured to compensate for different propagation time between the first node device and the respective further node device; and wherein the step of triggering is carried out concurrently in each node device of said group.

In one embodiment, the first node device is a MoCA management device comprising a first MoCA chip and being connected to an external data channel, and each further node device is a MoCA network end device comprising a further MoCA chip and a network access unit connected to the further MoCA chip.

According to a fourth aspect, a node device is provided which is configured to operate in a MoCA network with a further node device connected via a coaxial network, the node device comprising:

a connector for connecting to a coaxial network;

a signal transmitter, connected to said connector, configured to transmit a reference signal;

a measurement unit, connected to the signal transmitter, and connected to receive a loopback signal from a further node device, wherein the measurement unit is configured to measure a parameter value based on time lapse between transmission of the reference signal and reception of the loopback signal.

In one embodiment, the node device comprises a control unit configured to determine a time delay value dependent on the measured parameter value, and to send a control signal for reception by the further node device, indicating said time delay value.

In one embodiment, the node device comprises a reference signal bandpass filter connected between the connector and the transmitter, and a loopback signal bandpass filter connected between the connector and the time sensing unit.

According to a fifth aspect a node device is provided which is configured to operate in a MoCA network with a further node device connected via a coaxial network, the node device comprising:

a coaxial connector;

a signal detector, connected to said connector, configured to detect a reference signal received from a connected coaxial network;

a switch connected to the signal detector, configured to transmit a loopback signal responsive to the detector detecting a reference signal.

In one embodiment, the node device comprises:

a delay circuit, configured generate an activation signal by applying a time delay value to a trigger signal received by the signal detector, which time delay is associated with a propagation time through the coaxial network between the node device and the further node device; and a control unit configured to trigger executing of an action by means of the activation signal.

BRIEF DESCRIPTION OF THE DRAWINGS

Embodiments are described below with reference to the accompanying drawings, in which.

DETAILED DESCRIPTION

The invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected" to another element, it can be directly connected to the other element or intervening elements may be present. In contrast, when an element is referred to as being "directly connected" to another element, there are no intervening elements present. Like numbers refer to like elements throughout. It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Well-known functions or constructions may not be described in detail for brevity and/or clarity. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Embodiments of the invention are described herein with reference to schematic illustrations of idealized embodiments of the invention. As such, variations from the shapes and relative sizes of the illustrations as a result, for example, of manufacturing techniques and/or tolerances, are to be expected. Thus, embodiments of the invention should not be construed as limited to the particular shapes and relative sizes of regions illustrated herein but are to include deviations in shapes and/or relative sizes that result, for example, from different operational constraints and/or from manufacturing constraints. Thus, the elements illustrated in the figures are schematic in nature and their shapes are not intended to illustrate the actual shape of a region of a device and are not intended to limit the scope of the invention.

Embodiments provided herein serve to explain different ways of realizing a solution for improving synchronization between various MoCA node devices interconnected over a coaxial cable in a MoCA network. This may be beneficial e.g. for the purpose of performing Wi-Fi based positioning or carrying out various measurement applications. For these operations to work, synchronization must be as good as possible since even a small deviation from synchronization could negatively impact the localization or measurement accuracy. Oftentimes such synchronization cannot be based on GPS (Global Positioning System) since most MoCA node devices are commonly installed in a position where they cannot receive any GPS signal.

The embodiments presented herein are described as related to a communications network system, where MoCA technology is employed for providing data access to a plurality of independent user entities connected to a common coaxial network. This way, an already present coaxial network in e.g. a multi-family house, a hotel etc., can be employed for providing access to an external physical broadband data channel, such as an optical fiber cable. The MoCA network includes a plurality of MoCA node devices, connected to the same coaxial network. Of these node devices, one or more may be a network management device, which connects an external data channel to the coaxial network, which management device is configured with a MoCA chip. Further node devices may be one or more MoCA end devices, connected to the coaxial network, each comprising a MoCA chip. In this case, multiple node devices on the same channel share the same access medium, i.e. the coaxial network. Configuration of each MoCA end device may be crucial for enabling access to the external access network, securing network traffic isolation of individual access modems, assuring Quality of Service (QoS), and configuring other functionalities related to network parameters normally found in network chip devices. In various embodiments, a control unit comprising the MoCA chip in the network management device may be configured to establish an access function, creating a control channel over the coaxial network to each connected MoCA end device. In the MoCA end devices, a network access unit may be connected to a bus on the MoCA chip. This way, hardware signals triggered from the access function are input/output on the MoCA chip and via a bus directly to the network access unit in the MoCA end device. This creates a possibility to manufacture and design much less expensive MoCA Access modems. The savings consist of both reduced component count and reduced development time. Embodiments and methods for realizing this control signaling is disclosed in applicant's prior applications EP16178618.1 and U.S. Ser. No. 15/341,739, the content of which is incorporated herein by reference.

Figure 1:
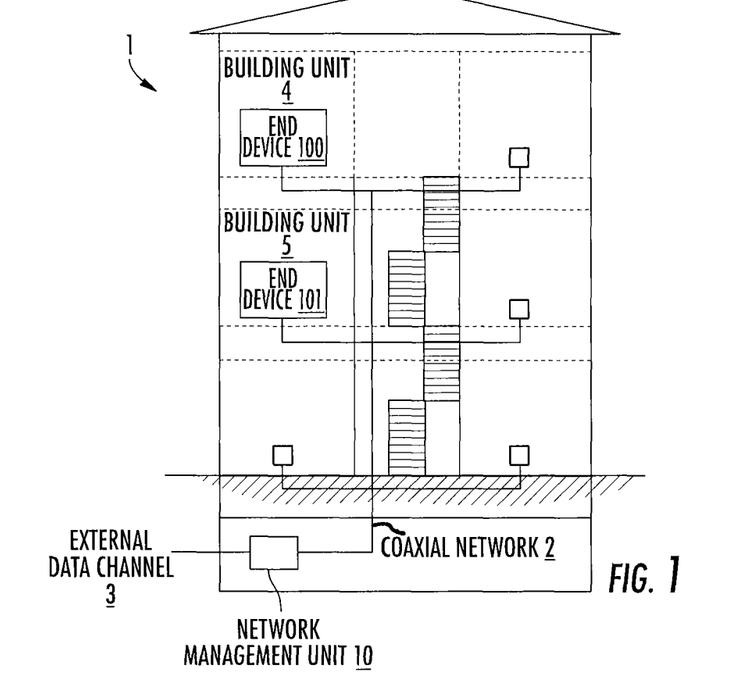
FIG. 1 schematically illustrates deployment of a system for providing data communication over a MoCA network in a construction complex.

FIG. 1 illustrates, by way of example, a construction complex 1 in the form of a single building. For the sake of completeness, it may be noted that the invention as described herein may be employed in a construction complex comprising a plurality of buildings having a common coaxial network, or interconnected coaxial networks. The construction complex 1 may e.g. be a block of apartments or a hotel. In the construction complex, a number of separate building units, such as apartments, hotel rooms, offices etc. are indicated by means of dashed lines. A coaxial network 2 is provided in the construction complex 1, having sockets in all or a plurality of the different building units, such as building units 4 and 5. Both apartment buildings and hotels normally have a coaxial network covering all apartments or hotel rooms for TV signal distribution. These cables can also be used for high speed Internet access, IPTV, VoIP, Web-TV services etc. without affecting the TV signal quality. In the proposed solution, a network management unit 10 is connected to the coaxial network 2, and connected to an external data channel 3, such as a supply data cable or an optical fiber. The network management device 10 may e.g. be installed in a basement, as illustrated, or on a loft of the building 1, and may be connected after a TV amplifier. The network management device 10 may make use of the previously un-used frequency spectrum above the regular TV spectrum (5-790 MHz) in coaxial cables for data transportation. The network management device 10 is configured to merge an incoming data stream from the external data channel 3 and a TV-signal, where applicable, into the same cable and to send it through the coaxial network 2. At the other end of the coaxial network 2, the signals are divided by an end device 100, 101, such as an access modem, operating under a MoCA specification. Since the data stream and TV-signal are using separate frequency spectrums, the TV signal is effectively isolated from the data stream.

Figure 2:
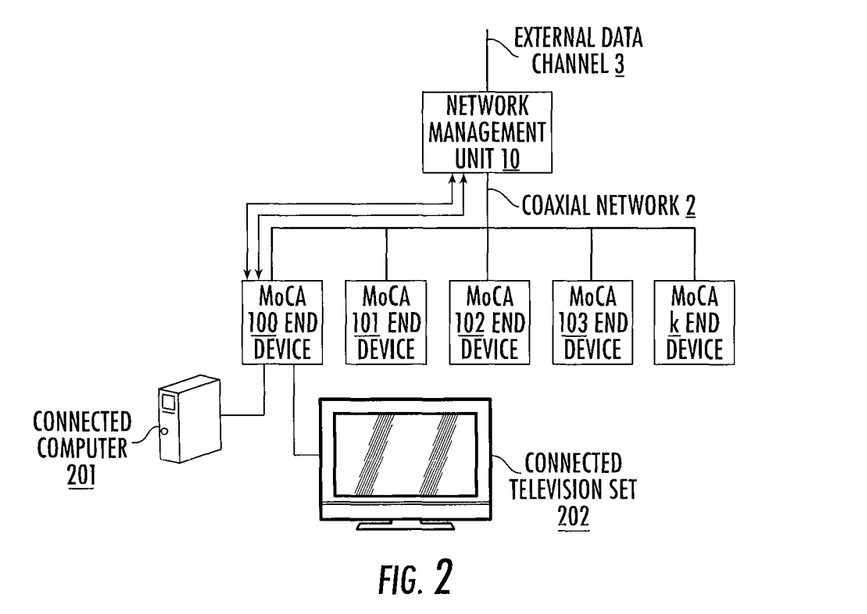
FIG. 2 schematically illustrates is a principle view of a system according to FIG. 1.

FIG. 2 illustrates the basic architectural structure of a system according to one embodiment, where the network management device 10 is shown at the top, connected between an external data channel 3 and a coaxial network 2. A plurality of MoCA end devices 100-104 are connected to the coaxial network 2, operable to obtain access to the external data channel 3 through the network management device 10. As an example, a MoCA end device 100 may receive television signals over the coaxial network 2 for output on a connected TV set 202, which may include or be connected through a set top box (not shown). In addition, the MoCA end device 100 may be configured to provide network access to a connected computer 201, usable for receiving multimedia data. The MoCA end device 100 may further comprise a wireless access point, for radio access to the MoCA end device 100 from various portable radio communication devices such as computers, mobile phones, tablets etc. Further configuration and operation of the system will be described with reference to the drawings of the network management device 10 and MoCA end device 100, respectively, by way of example.

A coaxial network in which a MoCA system is embodied may be of a star type, or a cascade type, or a combination thereof. In many older buildings having coaxial networks, the actual structure of the physical cables may in fact be unknown, since cable charts may have gone missing. This makes it even more difficult to know how far apart two node devices actually are located, signal wise. Synchronization of absolute frequency between all MoCA devices can easily be solved by introduction of a reference signal in the coaxial network. In one embodiment, this reference signal may be a GPS based reference signal provided from the management unit 10. A phase locked loop (PLL) in each end device 100, 101 may be configured to frequency lock to the reference. A common frequency may not provide sufficient performance for localization, since the reference signal arrives at different time instants to each MoCA end device 100, 101, when the coaxial network 2 has different cables lengths for each connection path. Each MoCA end device may need a trigger signal occurring at the same time instant triggering a localization measurement, measurement operation or other application requiring MoCA end devices to start a process or hardware function at the same time instant. Furthermore, this trigger signal can't be sent together with the reference signal since it would arrive at different time instants to the MoCA end devices.

In accordance with various embodiments presented herein, a solution for providing proper synchronization is to determine time delays associated with propagation time between two or more node devices in the coaxial network. It may be sufficient to determine the time delays from the management unit node $n_0$ to two other end node devices $n_1$ and $n_2$, which delays may then be referred to as $d_{(0,1)}$ and $d_{(0,2)}$. This may be enough where these two end node devices are to be used in a synchronized manner. In another embodiment, all time delays $d_{0,1}$-$d_{0,k}$ between a management node device and all end node devices $n_1$-$n_k$ are determined. In yet another embodiment, all delays $d_{i,j}$ are determined between each pair of node devices among a plurality of node devices. This way, all delays within the MoCA system of node devices may be determined. Once the time delays are known all MoCA end devices are synchronized in the sense that they may adjust a respective local time delay relative to a trigger signal sent from the MoCA management device. In one embodiment, the trigger signal may be provided in the form of a reference signal, in which the trigger may be a certain pattern in the reference signal. As an example, a trigger signal may be accomplished by turning on the reference signal or sending a pulse of the reference signal, at a certain point in time. The reference signal is preferably sent on a frequency that is not interfering with other signals in the coaxial network and that has properties that make it propagate without problems in the coaxial network. The reference signal is thus preferably separate from MoCA signals. Also, the reference signal must not interfere with airborne radio signals in case the coaxial network leaks due to bad screening material or loose/open connectors. The reference signal must also be sent at a frequency that is not attenuated too much at long cable distances. The reference signal frequency must also be high enough so it can cross over any capacitive decoupling that it may pass in the coaxial network. Each MoCA end device receives the signal and a time correction is done based on values from the time delay table. This way, each MoCA end device can work in a synchronous way.

Various embodiments are described herein as carried out with respect to a first node device and one or more further node devices. This serves the purpose of explaining how, dependent on the circumstances, a first node device acts in one way and a further node device acts in another way, including signaling between the two. In many embodiments, the first node device may be a MoCA management device 10, comprising a first MoCA chip and being connected to an external data channel 3, whereas and each further node device is a MoCA network end device 100, such as a modem, comprising a further MoCA chip 110 and a network access unit 111 connected to the further MoCA chip. In other embodiments, the first node device may be embodied as a MoCA end device, such as a modem. In a preferred embodiment, a common hardware unit including circuits and control functions may be conveniently incorporated in both the MoCA management unit and in the MoCA end devices, wherein control signaling may be employed to operate the hardware units in different modes.

In free air a radio signal propagates 1 meter in about 3.333 nanoseconds. In a coaxial cable a signal propagates with a speed depending on the cable properties, but typically a signal propagates 1 meter in about 5.3 nanoseconds. The length of a coaxial cable can vary but a cable is typically between one meter and several hundred meters in a construction complex incorporating a MoCA system. This means that a maximum propagation time from a transmitter to a receiver can be up to 1 microsecond or more.

In one embodiment, a first node device such as a MoCA management device 10 may be configured to send out reference signal F1 onto the coaxial network. The reference signal may e.g. be 10.7 MHz sine signal, taken from a GPS frequency reference receiver, or a signal converted from such a GPS signal, e.g. at 22.5 MHz. Alternatively, another high accuracy signal may be provided in the first node device, acting as reference signal F1. Each further node device in the MoCA system will receive this reference signal F1 at different points in time, due to different cable lengths causing different propagation time. Each further node device is configured to be able to be set to a loopback mode, whereby it is configured to respond to a received reference signal F1 with transmission of a loopback signal F2. This loopback signal F2 may be transmitted on a different frequency, e.g. at 62.5 MHz, which may be separated in the node devices by means of bandpass filters. In an alternative embodiment, the loopback signal F2 may be transmitted at the same frequency as the reference signal F1, at which they may be separated by using circulators in the respective node devices. In any respect, the first node device is configured to measure a time lapse T between transmitting the reference signal and receiving the loopback signal, which time lapse comprises at least the time lapse due to the double propagation time.

In one embodiment, where always one and the same node device, such as a MoCA management device 10, is configured to act as the first node device $n_0$, that first node device $n_0$ need sonly incorporate a signal generator capable of transmitting a reference signal F1, whereas all other further node devices $n_i$ comprise at least a signal generator be capable of transmitting a loopback signal F2. In one embodiment, each node device $n_i$ in the MoCA network includes a signal generator with output frequency F1 and F2, and a signal detector capable of detecting a signal with frequency F1 and F2. In an embodiment where the signal frequencies of F1 and F2 are different, each node device preferably also includes two bandpass filters with center frequencies of signals F1 and F2, respectively, and bandwidth BW1 and BW2. Transmitter (Tx) and Receiver (RX) bandpass filters may form part of a combiner filter, so that it can be attached to the coaxial network. In one embodiment, each node device $n_i$ preferably includes two analog switches, configured to change between transmitting and receiving mode for the respective frequencies of F1 and F2.

Figure 3:
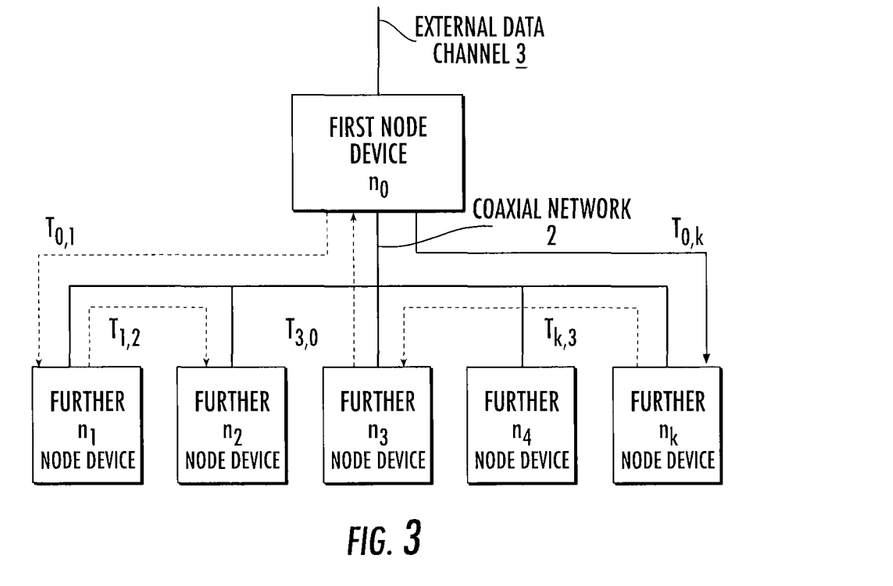
FIG. 3 schematically illustrates time lapse values between different node devices of a MoCA network associated with at least propagation time through the coaxial network according to an embodiment.

FIG. 3 illustrates a system setup according to one embodiment, in which at least the first node device $n_1$ must be able to measure time lapse T in an accurate way. Preferably, this function is incorporated in plural or all node devices $n_i$, i=1–k. In one embodiment, time lapse measurement is accomplished by commencing charging of a capacitor with a constant current upon transmitting reference signal F1, and subsequently measuring a voltage level upon detection of a responding signal F2, a certain time later. A sample and hold circuit may be included, configured to hold the voltage level constant while a control unit can sample the voltage level. The voltage level or difference is then treated as a parameter value based on time lapse between transmission of the reference signal F1 and reception of the loopback signal F2, the control unit may be configured to mathematically convert the parameter value to a time lapse T. This setup provides a solution for achieving time measurement in a cost-effective and efficient way, rather than an alternative embodiment making use of a microcontroller for measuring in the nanoseconds range, which normally is more expensive for large volume production.

In one embodiment, a first node device $n_0$ is always a set to a measurement mode, whereas all further node devices $n_i$ are set to a loopback mode. This is exemplified in FIGS. 4 and 5.

Figure 4:
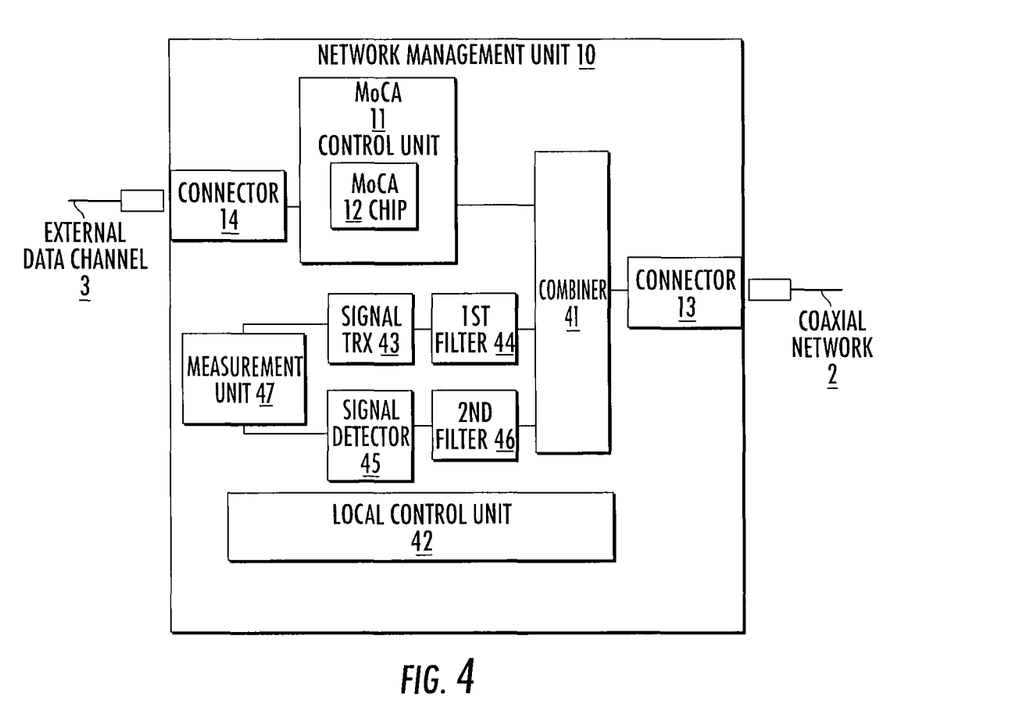
FIG. 4 schematically illustrates a node device configured in a measurement mode in a MoCA system according to an embodiment.

FIG. 4 schematically illustrates a first node device $n_0$, realized as a network management device 10 in one embodiment, comprising a connector 14 for connection to an external data channel 3, such as an optical fiber or other physical carrier of broadband data. At the other end of the network management device 10, a connector 13 is provided for connection to a coaxial network 2. A MoCA control unit 11 is provided in the network management device 10, inter alia for controlling communication with further node devices $n_i$, such as MoCA end devices 100 connected to the coaxial network 2. For this purpose, the control unit 11 includes MoCA chip 12. A MoCA chip is the hardware chip implementing the MoCA protocol and the HW required for fulfilling the MoCA specification, and such chips are available on the market. Hardware content in the MoCA chip typically includes baseband radio/power amplifier & Low noise amplifier, mixers, RF-switches, microprocessor, clock circuitry and an Ethernet packet bus of some type. MoCA chip makers apply the MoCA specification to the chip design by selection of chip content required to fulfill specification. This may vary depending on MoCA Specification version, of which currently versions 1.0, 1.1, 2.0, 2.5 exist. In the network management device, the control unit 11 may be operated to control a MoCA chip in the connected MoCA end devices $n_i$, and to access devices connected to the MoCA chip in such MoCA end devices. In the network management device 10, CATV and MoCA channels may be combined in a combiner 41, which is a frequency band selective device. The combiner may combine several MoCA channels and several CATV channels to be distributed to the same coaxial network 2. A network management device 10 may have several MoCA channels of different frequencies connected to a combiner and distributed to the coaxial network 2. The CATV signals may be origin from a satellite system, terrestrial TV system, fiber optical CATV distribution network or other source of CATV (separate input connectors for such CATV sources are not shown).

The first node device 10 further includes one or more hardware units, comprising different parts shown in FIG. 4, for measuring a time lapse T. As noted, the hardware units are preferably configured to be set in either measurement mode or loopback mode. This functionality can be integrated into the hardware unit by control signals from a local control unit 42 such as a microcontroller. In a simpler embodiment, a node device may be fixed in one of those modes. FIG. 4 illustrates a first node device 10 in a measurement mode, set or fixed, and elements that are not required for measurement mode are left out for the sake of convenience. As already noted, various embodiments are configured to distinguish between outgoing and incoming signals of the same frequency, by using circulators. In the embodiment of FIG. 4, though, the reference signal and the loopback signal propagate at different frequencies. A signal transmitter 43 is included, capable of transmitting at least a reference signal F1 of a first frequency. The signal transmitter 43 may comprise a signal generator, or it may take the frequency from a received base signal, such as a GPS signal. A first bandpass signal 44 may be included, preferably having a center frequency matching F1, and a sufficiently wide bandwidth BW1. A signal detector 45 may be connected to receive a loopback signal F2 from a further node $n_i$ device through the coaxial cable, preferably via a second bandpass signal 46. The second bandpass filter preferably has a center frequency matching F2, and a sufficiently wide bandwidth BW2. More specifically, a signal at the combiner 41 is preferably distinguished by the bandpass filters 44, 46, by means of non-overlapping bands. A measurement unit 47 may be connected to the signal transmitter 43 and to the detector 45. This measurement unit 47 may be configured to measure a parameter value based on time lapse T between transmission of the reference signal F1 and reception of a loopback signal F2, as will be described in further detail below.

Figure 5:
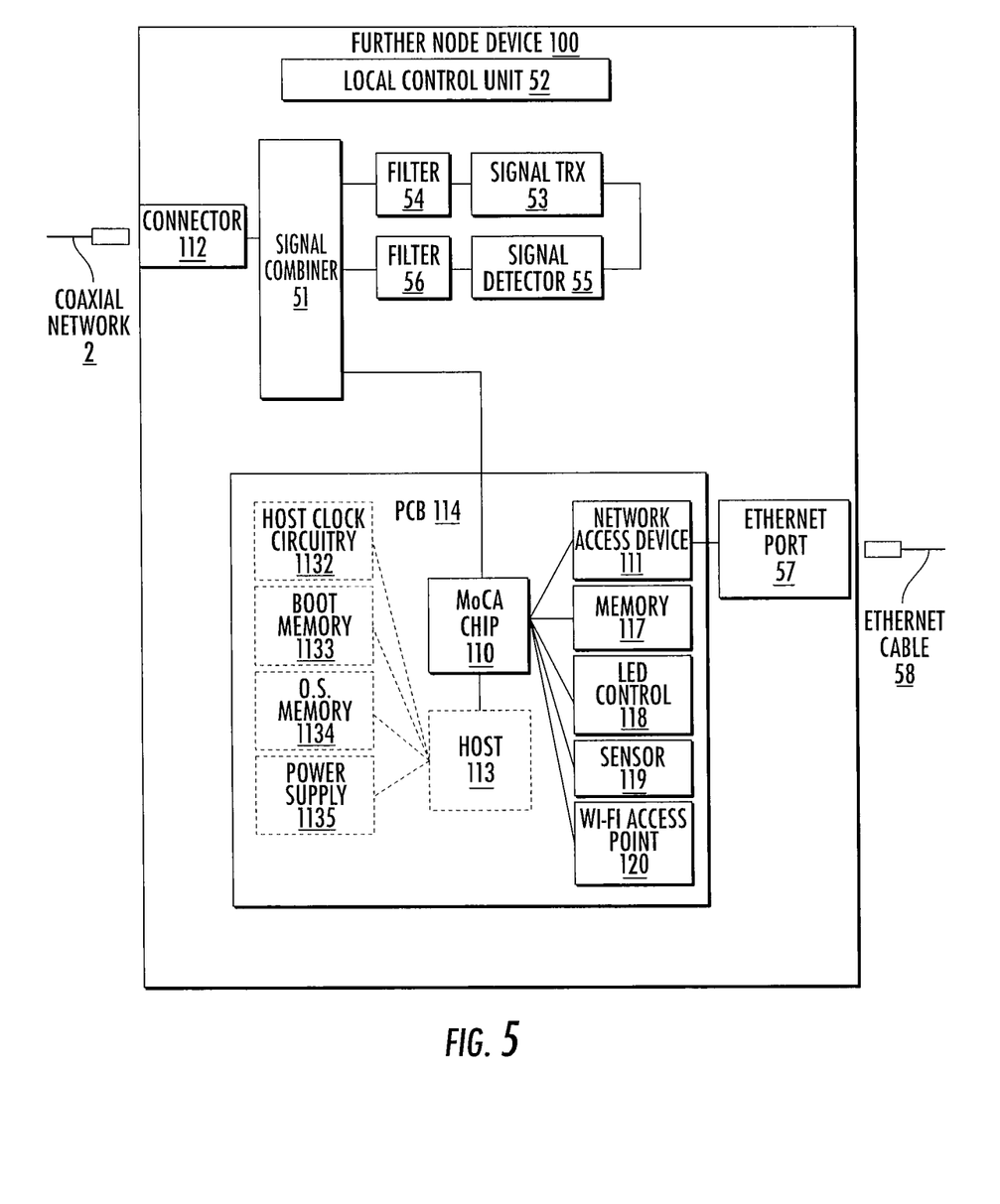
FIG. 5 schematically illustrates a node device configured in a loopback mode in a MoCA system according to an embodiment.

FIG. 5 illustrates a second or further node device 100, including one or more hardware units comprising different parts, and is configured to loopback mode. This functionality can be integrated into the hardware unit by control signals from a local control unit 52 such as a microcontroller. In a simpler embodiment, the node device may be fixed in the loopback mode. The drawing illustrates a further node device 10 in a loopback mode, set or fixed, and elements that are not required for loopback mode are left out for the sake of convenience.

The further node device $n_i$ in FIG. 5 is a MoCA end device 100, such as an MoCA modem or network adapter. Such a MoCA end device 100 may include a plurality of components, connected to one or more PCBs 114, held in a case (not shown). A connector 112 is provided for connection to a coaxial network 2. The coax connector 112 is connected to a MoCA chip 110. This may be accomplished by means of a direct connection, or e.g. over a signal combiner 51 as in the illustrated example. In one solution for MoCA modems, the MoCA chip 110 may in turn be connected with a management data clock (MDC)/management data input/output (MDIO) interfaces and an Ethernet bus from General-purpose input/output (GPIO) to a host device 113. The host device 113 may be connected with one or more of a Double Data Rate (DDR) memory 1131, host clock circuitry 1132, a boot memory 1133, an operating system memory 1134, and a power supply 1135 for host components and filters. In such a setup, the host device 113 may be a master and the MoCA device 110 a slave. The host device, typically a microprocessor or microcontroller, translates data communication from the MoCA device to all other connected hardware devices, such as indicated devices 111, 117-120, which may include a memory 117 connected by a Serial Peripheral Interface (SPI), LED control 118 connected by GPIO, sensors 119 connected through an I2C interface, an Ethernet switch 111 connected through an Ethernet bus, and a Wi-Fi access point (not shown). The Ethernet switch 111 may further be provided with an Ethernet port 57, for connection to an Ethernet cable 58. In a variant of this embodiment, the MoCA chip 110 is the master to the various connected devices, e.g. a Memory(SPI) 117, LED-control (GPIO) 118, a temperature sensor (I2C-bus) 119, a network access device 111, such as an Ethernet switch, and a Wi-Fi Access Point 120, or any other device using a data bus (I2C, SPI, MDC/MDIO, GPIO). The MoCA chip 110 may also be connected to a host 113 over MDC/MDIO, if needed, which in turn may be connected to various devices 1132-1135 as outlined above.

In addition to the MoCA functionality as described, the further node device 100 involves a control unit 52, which may be configured by programming to control the operation of the device 100 in the loopback mode. In addition, as briefly mentioned, the control unit 52 may be addressable by e.g. the management device 10 to set the node device 100 into the loopback mode, e.g. by means of switches. This way, it may be understood by the first node device $n_0$ which device $n_i$ that will return the loopback signal.

Connected to the signal combiner 51, a signal detector 55 is configured to detect receipt of an incoming signal F1. A bandpass filter 56 may preferably be provided between the combiner 51 and the detector 55, so as to configure the signal detector 55 to be responsive to F1 specifically, by selection of a corresponding center frequency and bandwidth BW1. The signal detector 55 may e.g. be configured to sense a certain signal flank, or the rise of a signal F1 over a certain level, according to the established art. A signal transmitter 53 configured to be triggered by detection of an F1 signal by detector F1, e.g. under control of control unit 52. The signal transmitter 53 is configured to transmit a loopback signal F2 to the combiner 51, for propagation over the coaxial cable 2. Another bandpass filter 54 may be provided between the transmitter 53 and the combiner 51, with a center frequency F2 and bandwidth BW2 corresponding to F2.

Figure 6:
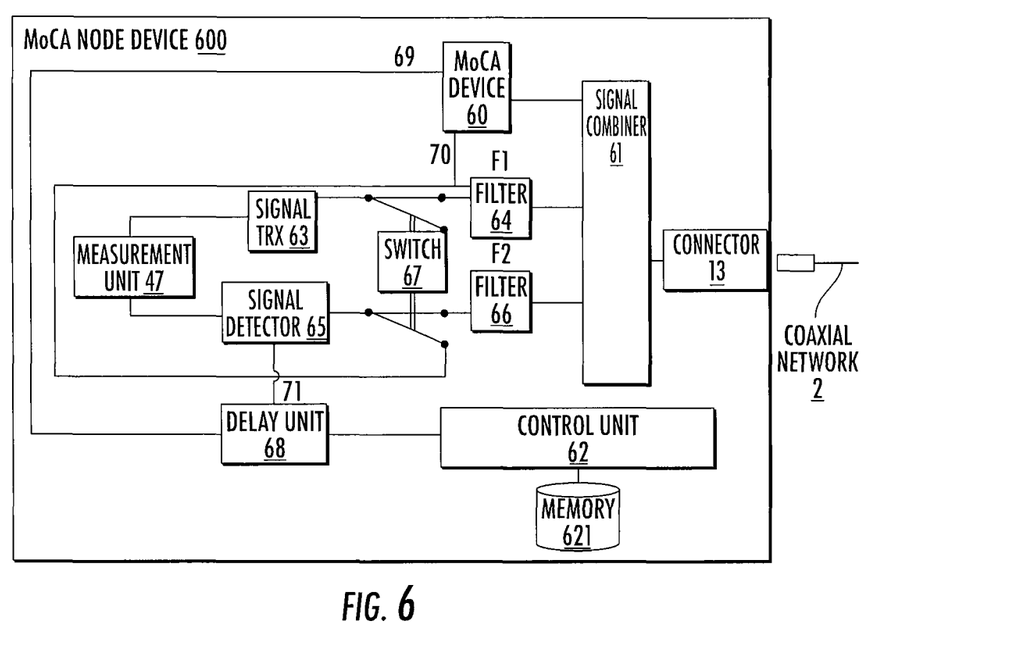
FIG. 6 schematically illustrates a node device comprising a circuit which may be selectively controlled to be set into a measurement mode or a loopback mode according to an embodiment.

FIG. 6 illustrates, by way of example, a device structure for implementation in a MoCA node device 600 according to the different embodiments described herein. This drawing exemplifies a hardware structure that may be employed in any MoCA node device 600 configured to operate in accordance with the embodiments described herein, whether it be a management device 10 (but leaving out a connector for connection to an external data channel) or an end device 100. A MoCA device 60 including a MoCA chip as described will not be described further herein. Otherwise, the hardware structure of the node device 600 includes at least a combination of the features described with reference to FIGS. 4 and 5 together with a switch device. The MoCA node device 600 has a connector 13 for connection to a coax cable 2, and a signal combiner 61 connected to the connector 13. The node device 600 further comprises a signal transmitter 63, which may include a signal generator, capable of transmitting a signal F1 and a signal F2. Alternatively, separate signal generators 43 and 53 may be included in the transmitter 63. The transmitter 63 preferably configured to selectively transmit any of at least the two frequencies of reference signal F1 and loopback signal F2. Alternatively, the transmitter may be configured to transmit a broadband signal that may be filtered into F1 or F2. The transmitter 63 is nevertheless connected to the combiner 61 through bandpass filters; one filter 64 for passing F1 and one filter 66 for passing F2. The node device 600 further comprises a signal detector 65. This signal detector 65 may comprise one detector 45 sensitive to at least a signal F2 and one detector 55 sensitive to detect a signal F1. Alternatively, detector 65 is sensitive to both F1 and F2. A measurement unit 47 may also be included, connected to the signal transmitter 63 and the signal detector 65.

In one setting, in the node device 600 is configured into measurement mode by means of a control unit 62, e.g. executed by means of a switch 67. The transmitter 63 is then configured to transmit F1 to the combiner, and to receive F2 to the detector 65, in the switch setting as shown in the drawing. The node device 600 may thereby operate as described with reference to FIG. 4. In another setting (represented by the dashed lines of the switch), the node device 600 is instead configured to operate in loopback mode. This may e.g. be set by a control unit of a management device 10, which communicates with a further device 600 so as to set said further device 600 into loopback mode. In this mode, the device 600 is configured to detect a reference signal F1 in the detector 65. The detection of the reference signal F1 triggers the transmitter 63 to emit an F2 signal, as described with reference to FIG. 5.

In preferred embodiments, the reference signal F1 may subsequently also be used for operating the synchronized MoCA network. For this purpose, a node device 600 may be configured to be set to an operational mode, where it is configured to detect F1, but preferably not to respond with a loopback signal F2. This setting may be accomplished with the switch 67, or e.g. by the control unit 62 disconnecting or turning off the signal transmitter 63. In this setting, the reference signal F1 may be conveyed to the MoCA chip 60 as a common clock reference signal 70, which may be used in a Phase-Locked Loop (PLL). In addition, a trigger signal 71 may be received with the reference signal F1 and detected by the signal detector 65, which trigger signal will be connected to a delay unit 68. The delay unit 68 may in turn be connected to transmit an activation signal 69 delayed by a determined time delay, which time delay may be stored in a memory 621, accessible by means of the control unit 62. The activation signal may be relayed to the MoCA chip 60 or to other circuits in the node device 600. This may typically be made under control of the control unit 62, and may involve retrieving accurate time delay data from the memory 621, pertaining to a suitable delay to be applied dependent on from which other node device the trigger signal 71 is received.

Again referring to FIGS. 4 and 5, an example of a measurement process usable in the method for determining time delay will be described with reference to.

The first node device 10 which is configured to measuring mode is preferably in control of the process for measuring a time lapse T, e.g. by means of control unit 42. Start of a measurement involves activating the signal transmitter 43. This may be a signal transmission triggered by the control unit 42. In an alternative embodiment, a reference signal F1 provided by the signal transmitter 43 may be a pulse train or similar, such that each pulse or on-period has a leading edge when the amplitude rises, that may be taken as a trigger for a time lapse measurement. Starting a measurement thus involves substantially simultaneously activating both the measurement unit 47 and the signal transmission of F1. In one embodiment, activating the measurement unit 47 involves charging of a measurement capacitor in the measurement unit 47. The transmitter, enabled with a frequency of signal F1, transmit a signal F1 which exits through the combiner unit 41 and onto the coaxial network 2.

After some time, the signal F1 has propagated through the coaxial network 2 and enters the signal detector 55 of a node device 100 configured for Loopback mode. When the F1 signal is detected it instantly triggers activation of a transmitter 53, which may include a signal generator of frequency F2, which transmitter 53 sends a signal F2 out through the combiner unit 51 and back on the coaxial network 2.

The loopback signal F2 enters the combiner unit 41 of the first node device 10, and is received by the signal detector 45 after passing bandpass filter 46. When the signal detector 45 senses receipt of F2 the measurement unit 47 is immediately triggered. In a preferred embodiment, a sample and hold unit samples the instantaneous voltage over a capacitor, which capacitor was subjected to charging upon detecting transmission of the reference signal F1. The control unit 42 may then be configured to read out a parameter value in the form of the voltage from the sample and hold circuit, e.g. by means of an analog to digital conversion. Dependent on known characteristics of the capacitor circuit, this voltage may subsequently be converted to a time lapse T.

The time lapse T measured by the measurement unit 47 is typically longer than only the time required for the signals F1 and F2 to propagate through the coaxial network 2. The time lapse T also contains a time period contributed by the analog and digital circuitry. However, this time period is typically almost constant, and the small variation can be accounted for by doing several measurements and averaging the result.

Time periods forming part of the total time lapse T include but is not limited to:
Activation time of the Transmitters $T_{T1}$, $T_{T2}$
Band pass filter rise times $T_{B1}$, $T_{B2}$ Coaxial cable propagation time $T_{fwd}$, $T_{rev}$ (the time lapse of interest)

Signal detection periods $T_{D1}$, $T_{D2}$

The total time delay is, in order of occurrence through the network:

$$T = T_{T1} + T_{B1} + T_{fwd} + T_{B1} + T_{D1} + T_{T2} + T_{B2} + T_{rev} + T_{B2} + T_{D2}$$

The constant part of the time lapse T that is not related to coaxial cable propagation time can be subtracted from the time lapse T by connecting a measurement mode hardware unit to a loopback mode measurement hardware unit and averaging several time lapse results.

When measuring a time lapse, a state of the art time measuring RC network may be employed. The voltage over a capacitor when charged by a current, as is well described in common electronics books, can be expressed as:

$$V(t) = V_0 \left(1 - e^{-\frac{t}{RC}}\right)$$

Where R is the resistor through which the charge current flows and C is the capacitance value of the capacitor. $V_0$ is the voltage which generates the charge current over R. Since only V(t) is depending on time lapse (t) the calculation of time lapse can be done if V(t) is known. This parameter value V(t) is preferably sampled in the measurement unit 47 under control of the control unit 42. When the detection of signal F2 triggers a sample event, the time lapse voltage cannot be allowed to change until the control device have sampled the voltage level. This will happen if the charging of the capacitor will continue. Preferably, a sample and hold circuit is triggered very fast by the F2 detector and then holds the voltage at a constant level until the control device has sampled the voltage. The control device then clears (zeroes) the capacitor voltage and a new measurement can start.

The calculated time period, as taken from the sample parameter value V(t) can be solved but must be divided by 2 since the signal propagates back and forth over the same cable. Rearranging and solving for propagation time gives:

$$-RC * \frac{\ln\left(1 - \frac{V(t)}{V_0}\right)}{2} - Const = \text{propagation\_time}$$

where Const is the constant delay introduced through the bandpass filters and the electronic measurement circuitry.

As noted with reference to FIG. 6, where a circuit structure for selective use in either a measurement mode or loopback mode is described, a transmitter 63 is required for sending either the F1 signal or the F2 signal. Since either the loopback mode or the measuring mode is selected, only one transmitter is required in each mode. Therefore, only one transmitter could be used provided that it may be configured to operate at two frequencies (F1 and F2). This would reduce the hardware costs and complexity of the design.

Similarly, a signal detector 65 is required for sensing the presence of either F1 or F2. Since either the loopback mode or the measuring mode is selected only one detector is required in each mode. Therefore, only one detector could be used if it can be configured for two frequencies (F1 and F2), which again would reduce the hardware costs and complexity of the design. If the frequencies F1 and F2 are chosen closely together a detector could be constructed that is wideband enough to detect both frequencies and it would then be the band pass filters that separate them. For detection of a F1 or F2 signal a full-wave rectifier and a diode detector can be used to sense presence of the signal arriving to the detector. The diode detector output can be amplified by an operational amplifier and a trigger voltage level can be set. The output can then trigger the sample and hold circuit or F2 transmitter.

Bandpass filters 44 and 46 are configured to block unwanted signals from entering the detector. The bandwidth BW1, BW2 must be large enough to enable fast rise times of the signals F1 and F2. A commonly assumed relationship between rise time and bandwidth are:

$$T_{B1} = T_{B2} = \frac{0.35}{BW_1} = \frac{0.35}{BW_2},$$

for a first order RC network.

The bandwidth must be large enough to make the rise times negligible compared to the total time lapse measurement period. The bandwidth in the coaxial network is so large that it will not influence the rise time. Rise times in the analog circuitry can with todays integrated circuit technology be kept small enough for an accurate measurement. A too long rise time though would impact the performance at short distance measurements so the bandwidth should be kept high enough. For example, a 35 MHz bandwidth filter would achieve 10 ns rise time.

The switch 67 indicated in FIG. 6 may be realized by means of bidirectional analog switches, configured to short circuit analog voltage from input/output to any of the two inputs/outputs. The switches serve to configure whether each frequency channel F1 or F2 are either in transmit or receive mode. The switch rise time is negligible and the switchover delay between output states does not affect the time lapse measurement since the switchover is done before the measurement starts.

Referring to FIG. 3, a MoCA network over a coaxial cable 2 is shown, including at least a first node device $n_0$ and a plurality of further nodes $n_1$-$n_k$. In accordance with the process steps described herein, propagation time $T_{a,b}$ between nodes a and b may be established, by measuring the time lapse between transmission of a reference signal and reception of a loopback signal. In one approximation, this time lapse may be taken as the double propagation time. In a more detailed approximation, a constant part may be subtracted from the measured time lapse, as described, to calculate the propagation time. As indicated in FIG. 3, at least the propagation time $T_{0,i}$ between the first node device $n_0$ and each further node device $n_i$ may thus be established. This result may subsequently be used for determining time delay values $d_{0,i}$, based on the time lapse between transmitting the reference signal and receiving the loopback signal in at least the first node device $n_0$. In an alternative embodiment, the propagation time $T_{i,j}$ between any pair of node devices within the plurality of node devices may be established. This may be obtained by controlling any node device i to act as a first node device, for transmitting a reference signal and receiving a loopback signal, together with another node device j. Preferably, the results in this establishment of propagation time is then reported by the node device i to a node device incorporated in a MoCA management device 10.

The obtained result may subsequently be used for determining time delay values $d_{0,i}$, for application between the first node $n_0$ device and a further node device $n_i$, or even $d_{i,j}$, for application between any two node devices $n_i$ device and $n_j$, based on the time lapse between transmitting the reference signal and receiving the loopback signal. In one embodiment, the determined time delay values $d_{i,j}$ are stored or formatted as a time delay matrix D, including time delay values for every path in the coaxial network where the ends are connected by a hardware circuit in a node device, which hardware circuit may be configured in either measurement mode or loopback mode. Each time lapse value corresponds to and can be converted to an approximate length of a coaxial cable path from measuring unit to loopback unit. Each node device in the network can then implement a local time delay unit 68, that delays a trigger signal received from a first node device, such as the MoCA management device 10. In the respective node device, the delay unit 68 is preferably configured to delay the trigger signal such that an activation signal 69 provided from the delay unit 68 executes an action substantially simultaneously in a plurality, or all, node devices.

In one embodiment, time lapse values $T_{i,j}$ which at least approximately represent propagation time between node devices $n_i$ and $n_j$, have been established. Delay values $d_{i,j}$, may then be determined as $$d_{i,j} = T_i^{max} - T_{i,j} + k,$$

where $T_i^{max}$ is the largest time lapse established from node $n_i$ to any of the other node devices, and k may be a constant having a value $\geq 0$. When k=0 this formula will provide the shortest possible delay that can be applied, if a substantially simultaneous activation signal 69 is to be established in each node devices that include $n_j$ and any closer node device (in terms of propagation time). A simpler formula may be applied if it is sufficient that the activation signal 69 is established simultaneously but not as soon as possible:

$$d_{i,j} = K - T_{i,j},$$

where K is $\geq T_i^{max}$ and maybe even $\gg T_i^{max}$, such that it reasonably exceeds any expected coaxial cable length within a building complex. As an example, K=10 μs would corresponds to nearly 2 km of coax cable, more than could be expected in most building complexes as a distance between the farthest pair of node devices.

In a preferred embodiment, one node device acting as a first node device $n_0$ will address a further node device $n_i$, signaling said further node device to enter loopback mode. This may e.g. be obtained by means of the control channel as described in the referenced prior applications EP16178618.1 and U.S. Ser. No. 15/341,739. Every other node device in the MoCA network connected to the same coaxial cable will thus ignore the signal F1. The first node device starts the measurement and calculates the time lapse to the other node device and stores it, e.g. in a time lapse table. The first node device then deselects the addressed node device by signaling it to leave loopback mode, and continues with a next node device in a list of node devices of the MoCA network, and the cycle starts over. This may continue until all time lapses are known, either only with respect to the first node device, e.g. the management device, or with respect to all node devices. As mentioned, the time lapse data can then be used for determining time delay values, usable for synchronizing MoCA end devices together by locally, in the respective node device, delaying a received signal, such as a reference clock based trigger. This may be accomplished with a phase locked loop and/or a delay locked loop. One important property required is that the control device must be able to control locally added delay in small steps so that the time delay resolution is sufficient for the application on the MoCA end device. For example, to attain 1 m resolution steps of approximately 5 ns would be required, and a 1 μs or more total delay required if a 1 m and 250 m cable would be paralleled on different coaxial cable branches in a star network.

In one embodiment, a management device 10 may control the process, and may configure one node device which is incorporated in a MoCA end device 100 to measurement mode and perform the measurement with respect to another node device of a MoCA end device 101 which is set to loopback mode. Preferably, the management device 10 then reads back the result of the establishment of the time lapse value, and stores it in a time lapse table. Then the management device 10 may shift modes of both MoCA end devices 100, 101 and start the measurement again in the reverse order, and subsequently saves the result. Then it continues with all possible combinations until all time lapses are known, as indicated in FIG. 3. Once the time lapses to all of a plurality of node devices of the MoCA network have been established, it is possible to determine time delay values for the respective node device, and set up a time delay table or matrix, which describes all individual time delays between all node devices in the coaxial network. In one embodiment, a node $n_0$ may be a MoCA management device 10, whereas node devices $n_1$-$n_k$ are MoCA end devices 101-$k$. The time delay value to itself is preferably always zero for any node. A time delay matrix may take the shape, such as:

$$D = \begin{pmatrix} 0 & \cdots & d_{i,0} \\ \vdots & \ddots & \vdots \\ d_{0,j} & \cdots & 0 \end{pmatrix}$$

The delay matrix D is preferably approximately reciprocal; i.e. $d_{i,j} = d_{j,i}$.

Figure 7:
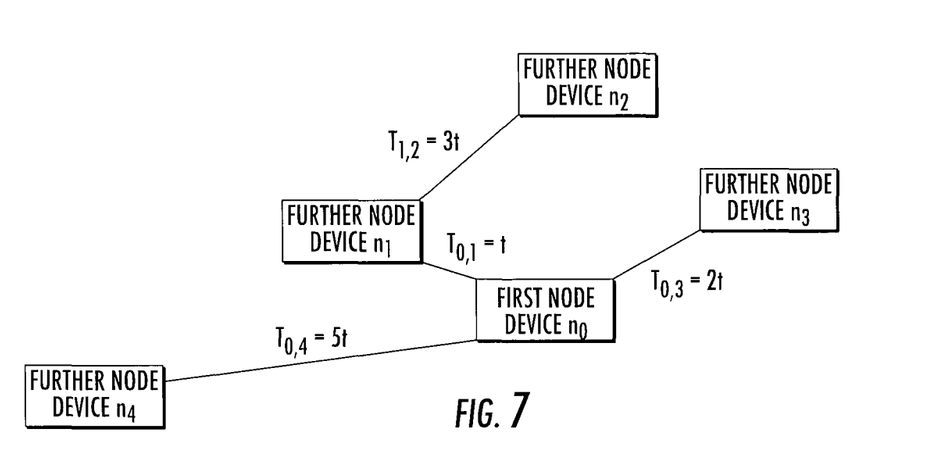
FIG. 7 schematically illustrates a MoCA system with node devices interconnected over a coaxial cable having different cable lengths to different node devices, according to an embodiment.

FIG. 7 schematically illustrates a MoCA network according to one simplified embodiment, in line with any of the embodiments described above. The MoCA network comprises a first node device $n_0$ and a number of further node devices $n_1$-$n_4$, which are interconnected over a coaxial cable 2, that forms a combination of a star network and a cascade network. All time lapses $T_{i,j}$ between the node devices may be established by measurement and possibly subsequent subtraction of constant factors, in accordance with the methods outlined in the examples above. Some of those time lapse values are indicated in the drawing, as exemplified integers of a time unit t, which may be an arbitrary time unit, e.g. t=100 ns. Once all time lapses have been established, it is possible to set up a time lapse value matrix, where the rows and columns are numbered 0-4 for node devices $n_0$-$n_4$:

$$T = \begin{pmatrix} 0 & 1 & 4 & 2 & 5 \\ 1 & 0 & 3 & 3 & 6 \\ 4 & 3 & 0 & 6 & 9 \\ 2 & 3 & 6 & 0 & 7 \\ 5 & 6 & 9 & 7 & 0 \end{pmatrix}$$

In this network, the longest time lapse is 5t to $n_4$ when $n_0$ is the reference. On the other hand, when $n_4$ is the reference, the farthest node device is $n_2$, which is 9t away. We can thus determine delay values $d_{i,j}$ for use in each node device, dependent on which other node device it shall treat as reference. Using the formula presented above, with k=0, each delay value may be determined as $$d_{i,j}=T_i^{max}-T_{i,j}.$$

The delay value matrix will then, for this specific example, take the following values:

$$D = \begin{pmatrix} 5 & 4 & 1 & 3 & 0 \\ 5 & 6 & 3 & 3 & 0 \\ 5 & 6 & 9 & 3 & 0 \\ 5 & 4 & 1 & 7 & 0 \\ 4 & 3 & 0 & 2 & 9 \end{pmatrix}$$

A delay value matrix determined based on the principles outlined with this example may be compiled and subsequently transmitted from e.g. a management device 10 acting as a first node device $n_0$, to all other node devices $n_1$-$n_4$. In the respective node device, it may be stored as data in a memory 621, accessible by means of a control unit 62.

A node device $n_j$ may thus be configured to operate in a loopback mode in a MoCA network with a further node device $n_i$ operating in a measurement mode, where these node devices are connected via a coaxial network 2. The loopback node device $n_j$ may be configured as the node device 600 exemplified in FIG. 6, and comprise a connector 13 for connecting to a coaxial network 2, and a signal detector 65, connected to the connector, which signal detector 55 is configured to detect a reference signal F1 received from a connected coaxial network. A signal transmitter 63 connected to the signal detector 55 may thus be configured to transmit a loopback signal F2 responsive to the detector detecting a reference signal.

In this context, the node device $n_i$ configured to operate in measurement mode in the MoCA network also has a connector 13 for connecting to a coaxial network, and may be configured as the node device 600 in FIG. 6. The measurement node device comprises a signal transmitter 63, connected to said connector, which is configured to transmit the reference signal to the coaxial network for reception by the loopback node device $n_j$. The node device $n_i$ configured to operate in measurement mode further comprises a measurement unit 47, connected to the signal transmitter 63, and also connected to receive a loopback signal F2 from the node $n_j$ to which the reference signal was sent. The measurement unit 47 is configured to measure a parameter value based on a time lapse $T_{i,j}$ between transmission of the reference signal F1 and reception of the loopback signal F2 in the node device $n_i$ configured to operate in measurement mode. A control unit 62 in the node device $n_i$ configured to operate in measurement mode is preferably further configured to determine a time delay value $d_{i,j}$ dependent on the measured parameter value, and to send a control signal for reception by the further node device, indicating said time delay value. The time delay value $d_{i,j}$ is preferably subsequently sent to the node device $n_j$, and stored in a memory 621 therein.

The time delay value may later be used for operating the MoCA system to execute an action substantially simultaneously in plural node devices n. For this purpose, the node device $n_j$ therefore preferably comprises a delay circuit 68, configured generate an activation signal 69 by applying a time delay value to a trigger signal 67 received by the signal detector 65. The time delay time delay value is preferably retrieved from the memory 621 by means of the control unit 62, and the appropriate $d_{i,j}$ is thereby selected which is associated with a propagation time through the coaxial network between the node devices $n_i$ and $n_j$. The control unit 62 is thereby configured to trigger execution of an action by means of the activation signal, which will then be activated substantially simultaneously in plural node devices which receive the same trigger signal 67 at different time instances, due to different propagation paths from the node $n_i$ transmitting the signal F1 carrying the trigger signal.

The methods related to synchronization of a MoCA network, and for performing a synchronized service in a MoCA network, as well as the node device configured to operate in a MoCA network as described herein, form a common general inventive concept, that makes it possible to manage actions in a MoCA system that need to be executed substantially simultaneously. Embodiments of the methods and node devices have been described by reference to the drawings, which serve as an explanation of how the invention may be put to practice, but these examples shall not be construed as limitations of the invention as defined by the claims.

The invention claimed is:

1. A method for synchronization of a MoCA (Multimedia over Coaxial Alliance) network including a plurality of MoCA node devices interconnected through a coaxial network comprising the steps of:

transmitting a reference signal from a first node device of the plurality of MoCA node devices onto the coaxial network, wherein the reference signal is not a MoCA signal and is transmitted separate from MoCA signals being transmitted by the first node device;

receiving a loopback signal from a second node device of the plurality of MoCA node devices through the coaxial network;

determining a time delay value based on a time lapse between transmitting the reference signal and receiving the loopback signal, said time delay value is associated with a propagation time through the coaxial network between the first node device and the second node device;

sending the time delay value to the second node device; and transmitting a trigger signal from the first node device to the second node device, wherein the second node device is configured to generate an activation signal by applying the time delay value to the received trigger signal and trigger execution of an action by means of the activation signal.

2. The method of claim 1, wherein the plurality of MoCA node devices comprise a plurality of pairs of first and second node devices and wherein said steps of transmitting, receiving and determining are carried out successively for each pair of node devices among said plurality of node devices.

3. The method of claim 2, further comprising the step of compiling a set of time delay values associated with each pair of first and second node devices; wherein the step of sending comprises sending said set of time delay values to each node device of the corresponding pair of first and second node devices.

4. The method of claim 2, wherein the reference signal is transmitted at a first frequency, and the loopback signal is received at a second frequency.

5. The method of claim 1, further comprising the step of compiling a set of time delay values associated with each of the first and second node devices; wherein the step of sending involves sending said set of time delay values to each of the first and second node devices.

6. The method of claim 1, wherein the time delay value determined for the second node device with respect to the first node device is configured to compensate for different propagation time between the first node device and the second node device.

7. The method of claim 1, further comprising the step of transmitting a control signal from the first node device onto the coaxial network, triggering the second node device to act as a loopback node.

8. The method of claim 1, wherein the reference signal is transmitted at a first frequency, and the loopback signal is received at a second frequency.

9. The method of claim 1, wherein the first node device is a MoCA management device comprising a first MoCA chip and being connected to an external data channel and the second node device is a MoCA network end device comprising a second MoCA chip and a network access unit connected to the second MoCA chip.

10. A method for synchronization of a MoCA (Multimedia over Coaxial Alliance) network including a plurality of MoCA node devices interconnected through a coaxial network comprising the steps of:
   receiving a reference signal transmitted from a first node device of the plurality of MoCA node devices, in a second node device of the plurality of MoCA node devices, through the coaxial network, wherein the reference signal is not a MoCA signal and is transmitted separate from MoCa signals being transmitted by the first node device;
   transmitting a loopback signal from the second node device to the first node device through the coaxial network, responsive to detecting the reference signal; and
   receiving a time delay value in the second node device, based on a time lapse between the first node device transmitting the reference signal and the first node device receiving the loopback signal, said time delay value is associated with a propagation time through the coaxial signal network between the first node device and the second node device;
   generating an activation signal be applying the time delay value to a trigger signal received from the first node device; and
   triggering execution of an action by means of the activation signal.

11. The method of claim 10, wherein the first node device is a MoCA management device comprising a first MoCA chip being connected to an external data channel and the second node device is a MoCA network end device comprising a second MoCA chip and a network access unit connected to the second MoCA chip.

12. A method for synchronization of a MoCA (Multimedia over Coaxial Alliance) network including a plurality of MoCA node devices interconnected through a coaxial network comprising the steps of:
   receiving a trigger signal, transmitted from a first node device of the plurality of MoCA node devices through the coaxial network, in a second node device of the plurality of MoCA node devices, wherein the trigger signal is not a MoCA signal and is transmitted separate from MoCA signals being transmitted by the first node device;
   generating an activation signal responsive to receiving the trigger signal, by applying a time delay value associated with a propagation time through the coaxial network between the first node device and the second node device, wherein the time delay value is based on which of the plurality of MoCA node devices the trigger signal is received from; and
   triggering execution of an action based upon the activation signal.

13. The method of claim 12, wherein the first node device is a MoCA management device comprising a first MoCA chip being connected to an external data channel and the second node device is a MoCA network end device comprising a second MoCA chip and a network access unit connected to the second MoCA chip.

14. The method of claim 12, wherein the step of receiving the trigger signal comprises receiving the trigger signal in a plurality of second node devices, said plurality of second node devices comprise a group; wherein the step of generating an activation signal is carried out in each second node device in said group by applying the time delay associated with the propagation time through the coaxial network between each of said second node device and the first node device, the time delay being configured to compensate for different propagation time between said first and second node devices; and wherein the step of triggering is carried out concurrently in each second node device of said group.

15. A first node device configured to operate in a MoCA (Multimedia Over Coaxial Alliance) network with a second node device connected via a coaxial network, the first node device comprising:
   a connector for connecting to a coaxial network;
   a signal transmitter connected to said connector, configured to transmit a reference signal, wherein the reference signal is not a MoCA signal and is transmitted separate from MoCA signals being transmitted by the first node device; and
   a measurement unit connected to the signal transmitter, and configured to receive a loopback signal from the second node device, wherein the measurement unit is configured to measure a time delay value based on time lapse between transmission of the reference signal and reception of the loopback signal, said time delay value is associated with a propagation time through the coaxial network between the first node device and the second node device,
   wherein the signal transmitter is further configured to transmit the time delay value to the second node device, wherein the second node device is configured to generate an activation signal by applying the time delay value to a trigger signal received from the first node device and trigger execution of an action by means of the activation signal.

16. The first node device of claim 15, further comprising:
   a reference signal bandpass filter connected between the connector and the signal transmitter;
   a time sensing unit; and
   a loopback signal bandpass filter connected between the connector and the time sensing unit.

17. The first node device of claim 15, further comprising a control unit configured to determine a time delay value dependent on the measured parameter value and to send a control signal for reception by the second node device, indicating said time delay value.

18. The first node device of claim 17, further comprising:
   a reference signal bandpass filter connected between the connector and the signal transmitter;
   a time sensing unit; and
   a loopback signal bandpass filter connected between the connector and the time sensing unit.

19. A first node device configured to operate in a MoCA (Multimedia Over Coaxial Alliance) network with a second node device connected via a coaxial network, the first node device comprising:

a coaxial connector;

a signal detector connected to said coaxial connector, configured to detect a reference signal received from the connected coaxial network, wherein the reference signal is (i) transmitted from the second node device, (ii) not a MoCA signal, and (iii) transmitted separate from MoCa signals being transmitted by the second node device;

a switch connected to the signal detector configured to transmit a loopback signal responsive to the signal detector detecting the reference signal;

a delay circuit configured to generate an activation signal by applying a time delay value to a trigger signal received by the signal detector from the second node device, said time delay value is associated with a propagation time through the coaxial network between the first node device and the second node device; and a control unit configured to trigger execution of an action by means of the activation signal.

20. The method of claim 1, wherein the reference signal includes a pulse having a leading edge, and wherein the method further comprises:

triggering, based on the leading edge of the pulse, a time lapse measurement simultaneously as the pulse of the reference signal is transmitted from the first node device to the second node device.

21. The method of claim 1, wherein the reference signal includes a flank, and wherein the loopback signal is transmitted by the second node device based on the second node device detecting the flank of the received reference signal.

* * * * *